March 11, 1958   W. S. FISHER   2,826,186
COMBUSTION CHAMBER
Filed Jan. 10, 1955

INVENTOR
Walter S. Fisher
BY G. L. all Mott
ATTORNEY

United States Patent Office 2,826,186
Patented Mar. 11, 1958

2,826,186

COMBUSTION CHAMBER

Walter S. Fisher, Birmingham, Mich., assignor to General Motors Corporation, Detroit, Mich., a corporation of Delaware Application January 10, 1955, Serial No. 480,736

1 Claim. (Cl. 123—191)

This invention relates to the construction of a combustion chamber for an internal combustion engine. The novel combustion chamber arrangement is particularly adapted for use in a valve-in-head type engine and which chamber reduces the detonation or knocking potential by facilitating more effective combustion. This objective is realized by providing a structure which enables the positioning of the spark plug terminals in close proximity to the center of the combustion chamber.

It is considered fundamental in an internal combustion engine that the ignition of the combustion charge be as fast as is consonant with progressive burning. Too rapid combustion, of course, results literally in an exposion rather than in burning. With such explosion there is a consequent failure to utilize fully the power potential of the charge. Too slow, or incomplete burning, on the other hand, provides the environment for detonation. The present combustion chamber construction is, therefore, dedicated to solving the ever-present problem of centering the ignition device relative to the combustion chamber in an overhead valve engine in order to achieve faster and more complete combustion.

While these considerations are well-known, each newly designed engine requires that the problems of proper combustion be met and frequently solved anew. The present invention was particularly developed for use with a type of valve-in-head engine employing a planar combustion chamber roof and which roof is preferably perpendicularly related to the engine cylinder axis. The basic problem of centering the spark plug terminals in the instant type engine arises because of the necessity of using a spark plug whose axis is inclined or angled to the combustion chamber roof. Previously known structures for mounting this type of spark plug have proven either to be physically impractical or functionally unsatisfactory with the particular combustion chamber herein involved.

The present invention, therefore, provides a spark plug mounting structure which facilitates the close positioning of the terminals of an angled spark plug relative to centrally disposed valve ports. This structure includes a spark plug receiving recess in the cylinder head and which recess communicates with the combustion chamber adjacent the valve ports.

The instant spark plug recess, in facilitating the more central disposition of the spark plug terminals, not only contributes to better engine combustion characteristics but also provides a structure which is much more simple to manufacture than has been previously possible with similar combustion chambers using angled spark plugs.

The present invention will be hereinafter set forth in greater details.

Figure 1:
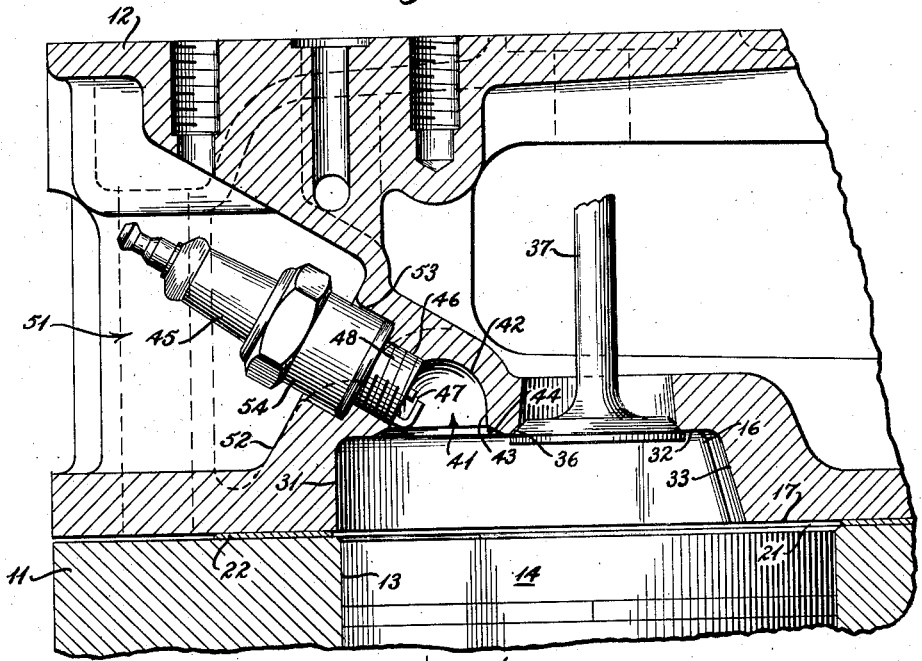
Figure 1 is a partial section through an overhead valve engine cylinder showing the subject combustion chamber taken in the direction of arrows 1—1 of Figure 2 and oriented ninety degrees therefrom.

Referring to Figure 1 a portion of a valve-in-head engine is shown and generally includes an engine block 11 and a cylinder head 12. The block 11 has the usual cylinder 13 and piston 14 disposed therein. The cylinder head 12 includes a combustion chamber 16 which overlies the open end of the cylinder when the head is assembled to the block. The combustion chamber 16 is not, however, co-extensive with the cylinder opening but rather the cylinder head has a portion 17 which overlies a portion of the cylinder opening.

In the present device the overlie portion 17 of the cylinder head and the piston 14 in its uppermost position, as shown in Figure 1, cooperate to define a "quench area" 21 having a high ratio of surface area to volume for reducing detonation.

A mechanical clearance is provided between the overlie portion 17 of head 12 and the piston 14, the extent of which may or may not be entirely determined by the thickness of a head gasket 22.

The combustion chamber 16 is generally quadrangular in cross section and includes an outer wall 31 which, at the section line of Figure 1, is parallel to the cylinder axis; a planar upper or roof wall 32 perpendicularly disposed to the cylinder axis, and a slightly inclined inner wall 33.

A pair of side-by-side valve ports or seats 34 and 36 are formed in the roof and are adapted to seat overhead inlet and exhaust valves.

The large port 34 is for an inlet valve, not shown, while the smaller port 36 is for an exhaust valve 37 shown in Figure 1. A line-of-centers through the valve ports is generally parallel to the center line of the engine.

To achieve the positioning of the spark plug terminals close to the valve ports 34 and 36, which in the case of this type of valve-in-head engine means close to the center of the combustion chamber, without interfering with the ports, the present invention provides a downwardly opening spark plug recess 41 formed in the combustion chamber roof. The recess is disposed intermediate the outer wall 31 and ports 34—36 as close to the latter ports as is possible. Recess 41 is substantially smaller than the combustion chamber, being in the nature of perhaps one-tenth the volume of the chamber. This volumetric relationship between the recess and combustion chamber is intended to be illustrative of the general proportioning involved and is not to be construed as a precise limitation. It will also be noted in Figure 2 that the diameter of the recess 41 is less than that of either of the valve ports 34 or 36.

Recess 41 comprises a downwardly opening hemispherical crown portion 42 and a short cylindrical portion 43 of the same diameter depending therefrom. A chamfer 44 is provided at the juncture of the cylindrical portion 43 and the roof 32 to avoid a sharp edge. The recess opening, as defined by the chamfered edge 44 is substantially in the same plane as valve ports 34 and 36, as viewed in Figure 1.

A tapped spark plug bore 46 is provided in the cylinder head and communicates at its inner end with recess 41. Bore 46 is adapted to threadedly receive a spark plug 45 so that the spark plug terminals 47 project within the recess 41. The axis of bore 46 is radially disposed to the hemispherical crown 42. In other words, the bore axis intersects the center of the hemispherical crown. This radial relationship between bore and crown is most important inasmuch as it results in the spark plug axis being disposed perpendicularly to the surface of the recess. Assuming that the length of the threaded portion 48 of the spark plug and the thickness of the recess wall are properly proportioned, it becomes apparent that the spark plug may be inserted within the bore so that the inner end of the bore and the inner end of the threaded portion 48 of the plug are coincident. In this way no threads are left exposed.

Figure 2:
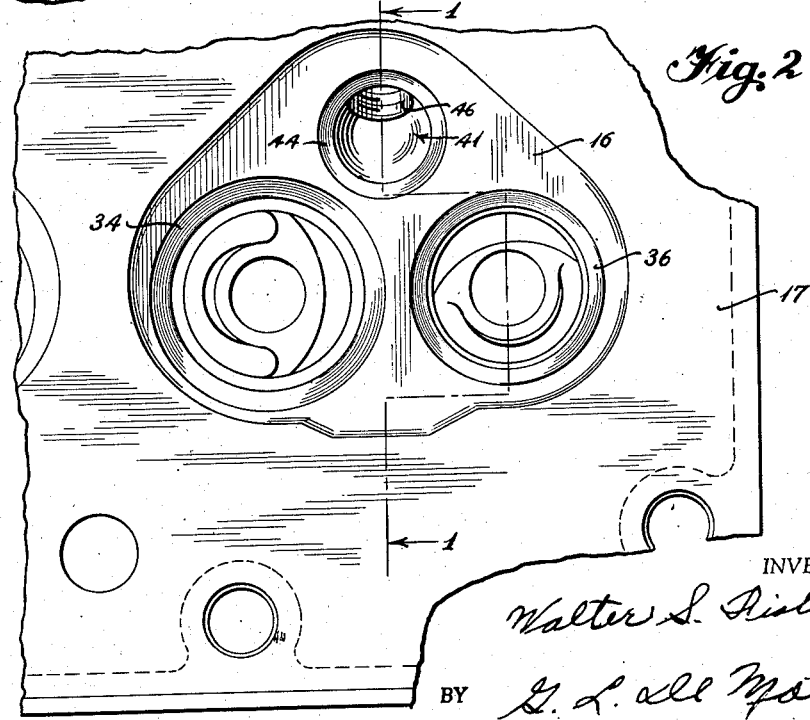
Figure 2 is a bottom view of the combustion chamber particularly showing the spatial relationship between the spark plug recess and the valve seats.

As seen particularly in Figure 2, the spark plug recess 41 is transversely offset with respect to the line-of-centers of the valve ports. The respective centers of the valve ports 34 and 36 are substantially equidistantly spaced from the center of the recess.

A cavity 51 is provided in the cylinder head for housing each spark plug 45. The general form of the cavity is immaterial save insofar as it is properly disposed with regard to the combustion chamber and is of an adequate size to allow easy access to the spark plug. Cavity 51 includes an inner wall 52 through which the spark plug bore 46 is formed and which is counterbored at 53 to receive a non-threaded portion 54 of the spark plug body.

It may be seen in Figure 2 that the combustion chamber is generally triangular in plan with the apexes being rounded to provide a smooth flow path for the circulating combustible charge. It is to be understood that this general triangular shape, while preferred, is not exclusive with respect to the shape such a combustion chamber may assume.

During the combustion cycle of an internal combustion engine, a layer of stagnant or unburnt combustion charge frequently remains around the periphery, or in areas otherwise remote from the ignition device, of the combustion chamber. This charge is normally at a high temperature and will detonate, or burn, after the main charge, if the temperature is caused to reach the combustion level, as might occur in contacting a hot spot in the chamber. Detonation, or terminal combustion, as it is sometimes called, has been the subject of considerable study, and many devices have been developed to reduce or eliminate the causes for its occurrence. To this end, the Ricardo type quench area 21 is designed to reduce the possibility of terminal combustion. The quench area 21 prevents terminal combustion in at least two important ways, the first of which is to reduce flame propagation in this area. Secondly, the high surface to volume ratio of the area 21 cools the charge in this part of the combustion chamber sufficiently to reduce the likelihood of detonation.

In order to reduce the quantity of unburnt charge, it is desirable to have the terminals 47 of the ignition device centrally located with respect to the combustion chamber 16. The more central this location, the more even will be the flame distribution throughout the chamber and correspondingly less of the charge will escape initial burning. Ideally, an ignition device perpendicularly disposed near the center of the combustion chamber roof would result in relatively equal flame distribution. It is apparent, however, that the limited space available above the combustion chamber 16 due to the disposition thereabove of the intake valves, air and cooling passages, as well as for reasons of general accessibility, it is necessary to use an angled spark plug. In referring to the angularity of such plug its axis may be considered to be inclined to the cylinder axis or to the combustion chamber roof.

It is requisite in guarding against detonation that there be no sharp edges, threads or otherwise, exposed in the combustion chamber. Such edges do not dissipate heat quickly and, therefore, develop points of high heat concentration, frequently denoted as "hot spots." Any "hot spot" in a combustion chamber may form a secondary ignition point, and thus cause the detonation of any remaining unburnt charge. Accordingly, particular care must be taken in all types of combustion chambers not to leave exposed threaded portions on the spark plug or on the cylinder head itself.

A corollary to tapping an angled spark plug bore directly through a combustion chamber wall has been the need to chamfer the inner end of the bore to remove any threads which will not be engaged by the spark plug when in position. The obvious disadvantage in thus chamfering the bore is that the threaded length of the bore must necessarily be reduced in the amount of the chamfer depth and, accordingly, it is impossible to thread the spark plug as far into the combustion chamber, which means as close to the center of the combustion chamber, as would be possible if chamfering were unnecessary. With a spark plug bore perpendicularly related to the combustion chamber surface, the terminal end of the spark plug thread may be coincidently disposed with respect to the inner end of the bore so as to eliminate any unengaged threaded bore portions.

Due to the frequently difficult angle at which a chamfering tool must approach the inner end of an angled spark plug bore, it is necessary to precede the chamfering operation with another machining operation to provide a cut away or elongated relief portion in the combustion chamber wall to ensure clearance for the chamfering tool as it is inserted or withdrawn. Thus where a spark plug enters the combustion chamber at an angle directly through the roof, as is necessary in the subject construction, the plug bore would have to be sufficiently spaced from the valve seats, or center of the combustion chamber, to prevent the elongated tool relief from interfering with the valve seats, which, of course, would otherwise cause the latter to improperly seat the associated valve member.

In the subject device the provision of the recess 41 precludes the necessity for chamfering the inner edge of the bore 46 and accordingly avoids the need for providing a tool relief area.

As may be best seen in Figure 1, forming the instant spark plug recess 41 involves a relatively simple machining operation. To this end, any suitable drilling tool may approach the combustion chamber roof 32 perpendicularly and thus there is no need to additionally cut away the combustion chamber surface to provide tool clearance. It is a matter of choice whether the recess, including the hemispherical crown 42, the cylindrical portion 43 and the chamfer edge 44, is cut with a single tool or a multiplicity of individual tools.

To better appreciate the significance of positioning the spark plug 45 in the recess 41 rather than directly in the combustion chamber roof, the following comparison is noteworthy. It has been found in one type of engine employing the present combustion chamber that in using the subject recess, it is possible to move the spark plug terminals three-eighths of an inch closer to the valve ports than is possible by mounting the plug directly in the combustion chamber roof. In order to assay the significance of this gain, consider that in the type of combustion chamber involved the width of the chamber, as viewed in Figure 1, is approximately three inches. Accordingly, the three-eighths of an inch change represents an approximate 13% improvement in the spark plug position with respect to the center of the combustion chamber. It is at once obvious that any such corresponding percentile improvement in the anti-detonation characteristics of the engine would be significant. Thus, not only are better operating characteristics manifested in an engine utilizing the subject spark plug recess but the combustion chamber itself is more easily and economically manufactured than has previously been possible.

Additionally and importantly, one of the fundamental advantages, in addition to ease of machining, of having a hemispherical crown in the recess, is that the angular disposition of the spark plug may be varied, in the first instance, simply by changing the radial inclination of the spark plug bore. In the subject device the spark plug or bore axis is inclined upwardly at an angle of approximately 30° to the roof 32. It is clear that this angle could have been changed initially by drilling a bore radially to any preferred angle within the general limits imposed by the cylinder head construction. It is apparent that this ability to vary the angularity of a spark plug once the combustion chamber is formed while still maintaining the critical perpendicular relationship between the bore and the cooperating wall surface of a planar walled combustion chamber is possible only with the present hemispherically crowned recess.

The vertical height of recess 41 may be varied to alter the relative vertical displacement of the spark plug terminals 47 from the combustion chamber roof in accordance with preferred operating characteristics. As shown in Figure 1, the spark plug terminals are disposed entirely within the recess 41. This particular disposition of the spark plug terminals is protective and reduces somewhat the fouling that occurs when they are completely exposed within the combustion chamber. Likewise, by controlling the vertical position of the terminals within the recess, flame propagation and flame contour may be modified.

While the centers of the intake and exhaust valves 34 and 36 have been disclosed as equi-distantly disposed from the center of recess 41, it is understood that under certain conditions it is preferable that the spark plug terminals be more closely positioned to one port than the other. This off-center positioning of the ports relative to the spark plug terminals is also part of the battle against detonation and is usually for the purpose of insuring an equal rate of flame travel in all directions, which as already noted, insures more complete burning of the charge. In any event, the present invention is applicable to the unbalanced arrangement of the valve ports with regard to the terminals as well as to the subject type arrangement.

While certain physical characteristics have been noted in the description of the above combustion chamber, it is intended that the subject invention may be utilized with any internal combustion engine in which it is necessary to angularly mount the spark plug with respect to a combustion chamber wall.

What I claim is:

In an internal combustion engine including in combination a cylinder, a piston reciprocable in said cylinder, a cylinder head, a combustion chamber in said head adjacently communicating with said cylinder, said chamber having a generally triangular plan conformation and quadrangular elevation conformation and a roof perpendicularly disposed to the cylinder axis, a pair of valve ports in said roof, a cylindrical passage in said roof extending parallel to the cylinder axis and communicating with said chamber, the open end of said passage being relieved and said valve ports being substantially co-planar therewith, said passage terminating in a downwardly opening hemispherical crown, a spark plug bore in said cylinder head radially communicating with said hemispherical crown on the side thereof remote from said valve ports, and a spark plug mounted in said bore so that the spark plug terminals are disposed centrally of said hemispherical crown and above the plane of said passage opening and valve ports.

References Cited in the file of this patent
UNITED STATES PATENTS

| | | |
|---|---|---|
| 1,511,706 | Burtnett | Oct. 14, 1924 |
| 1,757,399 | Taub | May 6, 1930 |
| 1,817,390 | Meyer | Aug. 4, 1931 |
| 2,029,581 | Merriam | Feb. 4, 1936 |
| 2,617,400 | Weaving | Nov. 11, 1952 |
| 2,737,170 | McDuffie | Mar. 6, 1956 |
| 2,749,900 | Mitchell | June 12, 1956 |